(12) United States Patent
Tung (10) Patent No.: US 8,950,859 B2
(45) Date of Patent: Feb. 10, 2015

(54) MULTI-FOCAL OPTICAL LENSES (71) Applicant: Hsiao-Ching Tung, South Pasadena, CA (US)

(72) Inventor: Hsiao-Ching Tung, South Pasadena, CA (US)

(73) Assignee: Global-OK Vision, Inc., Taipei (TW)

( * ) Notice: Subject to any disclaimer, the term of this patent is extended or adjusted under 35 U.S.C. 154(b) by 0 days.

(21) Appl. No.: 13/726,538

(22) Filed: Dec. 24, 2012

(65) Prior Publication Data

US 2013/0182215 A1 Jul. 18, 2013

Related U.S. Application Data (60) Provisional application No. 61/580,226, filed on Dec. 25, 2011, provisional application No. 61/726,868, filed on Nov. 15, 2012.

(51) Int. Cl.
*G02C 7/06* (2006.01)
*G02C 7/04* (2006.01)

(52) U.S. Cl.
CPC  *G02C 7/041* (2013.01); *G02C 7/06* (2013.01); *G02C 7/044* (2013.01); *G02C 7/047* (2013.01)
USPC ............. 351/159.05; 351/159.01; 351/159.02

(58) Field of Classification Search
USPC ............... 351/159.05, 159.06, 159.1, 159.12, 351/159.14, 159.16, 159.78, 159.23
See application file for complete search history.

(56) References Cited

U.S. PATENT DOCUMENTS

| | | | |
|---|---|---|---|
| 6,543,897 B1* | 4/2003 | Tung | 351/159.23 |
| 6,652,095 B2 | 11/2003 | Tung | |
| 6,874,887 B2* | 4/2005 | Tyson | 351/159.41 |
| 7,070,275 B2 | 7/2006 | Tung | |
| 7,101,042 B2 | 9/2006 | Perel et al. | |
| 2002/0060776 A1* | 5/2002 | Hodur et al. | 351/161 |
| 2002/0186345 A1* | 12/2002 | Duppstadt | 351/161 |
| 2005/0062933 A1* | 3/2005 | Perel et al. | 351/161 |
| 2005/0105046 A1* | 5/2005 | Tung | 351/161 |
| 2009/0033865 A1* | 2/2009 | Chang | 351/162 |
| 2009/0303434 A1* | 12/2009 | Tung | 351/161 |
| 2010/0110382 A1* | 5/2010 | Legerton | 351/247 |
| 2011/0051079 A1* | 3/2011 | Martinez et al. | 351/160 R |

OTHER PUBLICATIONS

International Search Report and Written Opinion, International Patent Application No. PCT/US2012/071595, Apr. 11, 2013.

* cited by examiner

*Primary Examiner* — Suchin Parihar
*Assistant Examiner* — William R Alexander
(74) *Attorney, Agent, or Firm* — Michael Fedrick; Loza & Loza, LLP (57) ABSTRACT

A multi-focal lens having a center optical zone for creating a first focal point within 2° of the optical axis and a peripheral optical zone located adjacent the center optical zone for creating a second focal point from 2° to 10° of the optical axis, the peripheral optical zone having a correction of at least 2 diopters more than the center optical zone.

24 Claims, 6 Drawing Sheets

MULTI-FOCAL OPTICAL LENSES

BACKGROUND

Many people experience difficulties with their vision due to a number of possible conditions. The most common vision problem is a condition known as myopia or nearsightedness. Myopia is a common condition where an eye cannot focus on far-away objects because the cornea of the eye is curved too steeply (i.e., where the radius of curvature of the cornea is smaller than normal) to provide adequate focusing at the retina of the eye. Another condition is known as hyperopia or farsightedness. With hyperopia, the eye cannot focus on both far and near objects because the curvature of the cornea of the eye is too flat (i.e., where the radius of curvature of the cornea is larger than normal) to provide adequate focusing at the retina of the eye. Hyperopia is common among young children. Severe hyperopia will induce lazy eye or amblyopia in childhood. Another common problem is astigmatism, where unequal curvature of one or more refractive surfaces of the cornea prevents light rays from focusing clearly at one point on the retina, resulting in blurred vision.

Presbyopia is the most common vision problem in adults 40 years and older. It does not matter whether they are emmetropic, myopic or hyperopic in distance vision, the middle-aged population over 40 years old will begin to experience difficulty in focusing on close objects, due to the loss of flexibility of the eye's crystalline lens. Presbyopia may occur and complicate other refractive problems such as hyperopia, myopia or astigmatism.

Presbyopia is a condition for which no entirely suitable permanent treatment has been developed. The most common conventional way is to wear spectacle glasses. The spectacle glasses can comprise two pairs of single vision glasses, one pair for near vision and another for far. The glasses can also be incorporated in a single pair of multi-focal glasses that has two or more focal points in different zones of the glasses by alternating the visual or optical axis between far and near zones. One approach to correcting presbyopia is through laser surgical reshaping of the cornea. However, such surgical procedures have not been entirely safe and there have been less favorable vision outcomes for presbyopia surgery than for myopia surgery. Presbyopia can also be corrected by the implantation of intraocular lenses (IOL) with multifocal designs to substitute for a subject's original crystalline lens for patients receiving cataract surgery.

Another way for correcting presbyopia is to wear contact lenses with multi-focal designs. There are two major types of multi-focal contact lenses for correcting presbyopia, the translating and simultaneous vision designs. The former type (the translating multi-focal contact lens) has at least two separate areas or zones for far and near vision respectively. The reading segment has to be positioned appropriately for effective reading and yet not interfere with distant vision. The user usually has to read with a posture of head tilting or downward gazing to appreciate the translating bifocal.

Simultaneous vision contact lenses can be a bifocal or multifocal in design. In either design, the center of the lens can be the distance (CD or Center distance) or near (CN or center near) refractive power. Multi-focal designs generally have at least two distinct zones of two different powers. Most of the multi-focal contact lenses are aspheric and have a gradient power changing with a certain eccentricity value from the lens center outward. The simultaneous multi-focal lens forms an image mixing both distant and near focus with a variety of focused and defocused portions of the image. The simultaneous vision lens, though more convenient for less presbyopic patients with lower ADD, is far less satisfactory in more advanced presbyopia.

Another approach to treating presbyopia is to alter the corneal shape by wearing contact lenses which are designed to continually exert pressure on selected locations of the cornea to gradually force or mold the cornea into the desired normal corneal curvature. This method of treatment is commonly referred to as orthokeratology (referred to herein as "ortho-k"). Treating presbyopia using ortho-k lenses has been disclosed in the U.S. Pat. Nos. 6,652,095 and 7,070,275 to Tung, for example.

Notwithstanding the improvements provided by modern spectacles, contact lenses, intraocular ocular lenses, refractive surgery and orthokeratology for presbyopia, there remains a need for optical devices that achieve better multi-focal correction for presbyopia.

SUMMARY

The present invention provides optical devices, and in particular lenses, that provide better multi-focal presbyopia correction with a preferential visual span for reading. Ortho-k contact lenses designed on the same principle can provide a structure to mold the cornea surface for a multi-focal presbyopia correction with preferential visual span for reading. The present lenses provide center power for distant vision (CD) and peripheral power for near vision with a preferential visual span (PVS) for reading. The present optical device has a center optical zone subtending a visual angle of about 5°, corresponding to the 1.5 mm fovea area. The adjacent outward portion of the optical device further provides a near optical zone having a shorter focal length or ADD power to provide near vision correction subtending a visual angle beyond the center 5° but within 10° to 20° of the visual or optical axis corresponding to the parafovea (0.5 mm to each side and circumscribing fovea) and perifovea (1.5 mm to each side and circumscribing the parafovea) areas for reading. The clarity contrast between the far and near vision optical zones for the different focal lengths has to be significant enough for the brain to automatically select the off-axis parafovea and/or perifovea images for perception to appreciate a preferential visual span (PVS) for reading.

The present invention comprises a multi-focal lens for aiding or correcting vision, in particular for presbyopia correction. The present multi-focal lens includes a center optical zone in a central portion of the lens and a peripheral optical zone located adjacent and radially outwardly from the center optical zone. The center optical zone focuses light that enters the front surface of the lens in a direction substantially parallel to the optical axis of the lens to create a first focal point within 2.5° of the optical axis, while the peripheral optical zone focuses light in a direction not parallel to the optical axis to create a second, non-overlapping focal point at between 2° and 10° with respect to the optical axis. In addition, the curvature of either the front surface or the back surface of the lens in the peripheral optical zone is steeper than the curvature of the front surface or the back surface of the center optical zone by at least 2 diopters, and more preferably by at least 4 diopters. Preferably, the curvature of the front surface of the peripheral optical zone is steeper than the curvature of the front surface of the central optical zone by at least 2 diopters. In a preferred embodiment, the curvature of the front surface of the peripheral optical zone becomes progressively steeper radially outwardly from an inner radial zone to an outer radial zone, with the curvature of the front surface of the inner radial zone being at least 4 diopters steeper than the curvature of the front surface of the center optical zone, and the curvature of the front surface of the outer radial zone being up to 10 diopters steeper than the curvature of the front surface of the center optical zone. The curvature of the front surface of the center optical zone also preferably merges with the curvature of the front surface of the peripheral optical zone with an aspheric or reverse-aspheric curve having a predetermined e-value, such as an e-value between −0.7 and −3.0 e, with the curvature becoming progressively steeper radially outwardly.

The present lens can be, for example, a spectacle lens, a contact lens, or an intraocular lens. When the lens is a contact lens, the center optical zone preferably has a diameter of between 0.4 mm and 0.6 mm, and the peripheral optical zone preferably extends radially outwardly at an annular diameter of between 0.75 mm and 2.0 mm, and more preferably of between 0.85 mm and 1.8 mm, from the center of the lens. Such a contact lens can further include an inner intermediate zone coupled to and extending radially outward from the peripheral optical zone, having a refractive power for far vision, as well as an outer intermediate zone coupled to and extending radially outward from the inner intermediate zone. The outer intermediate zone can have a front surface having a curvature steeper than the curvature of the front surface of the inner intermediate zone by between 1 and 30 diopters, thereby forming a steep ridge for simulation of an ortho-k treatment zone for myopia retardation.

In another embodiment, the present lens can be a contact lens for orthokeratology, in which case the back surface of the lens is adapted to mold a front surface of a subject's cornea so that the corneal surface includes a center optical zone in a central portion of the subject's cornea that focuses light in a direction substantially parallel to the optical axis to create a first focal point within 2.5° of the optical axis and a peripheral optical zone located adjacent and radially outwardly from the center optical zone that focuses light in a direction not parallel to the optical axis to create a second, non-overlapping focal point at between 2° and 10° with respect to the optical axis. The center optical zone in this embodiment preferably has a diameter of between 0.4 mm and 0.6 mm, and the peripheral optical zone preferably extends radially outwardly at an annular diameter of between 3 mm and 5 mm from the center of the lens. The curvature of the back surface of the center optical zone also preferably merges with the curvature of the back surface of the peripheral optical zone with an aspheric or reverse-aspheric curve having a e-value between −0.8 and −3.5 e, with the curvature becoming progressively steeper radially outwardly. In addition, the back surface of the ortho-k lens preferably includes an inner connecting zone coupled to and extending radially outward from the peripheral optical zone, having a curvature flatter than the peripheral optical zone by between 1 and 10 Diopters, as well as an outer connecting zone coupled to and extending radially outward from the inner connecting zone for bearing the contact lens on the cornea.

When the present lens is a spectacle lens, the center optical zone preferably has a diameter of between 1.35 mm and 1.75 mm, and the peripheral optical zone preferably extends radially outwardly at an annular diameter of between 2.3 mm and 6 mm from the center of the lens. In addition, the present lenses can be used in the treatment of presbyopia and myopia progression, but providing a subject with presbyopia or at risk for myopia progression with one of the present lenses.

In a further embodiment, the present lens can be a multifocal rigid contact lens for performing orthokeratology. The lens in this case can have a center optical zone in a central portion of the lens having a diameter of between 0.4 mm and 0.6 mm, where the back surface of the center optical zone has a central base curve. The lens further includes a peripheral optical zone located adjacent to and radially outwardly from the center optical zone, the peripheral optical zone having an annular diameter of between 3 mm and 5 mm from the center of the lens. The back surface of the peripheral optical zone further includes a peripheral base curve which is steeper than the central base curve by between 2 and 10 diopters. Preferably, the central base curve of this lens merges with the peripheral base curve with an aspheric or reverse-aspheric curve having a e-value between −0.8 and −3.5 e, and the merged curvature becomes progressively steeper radially outwardly. The lens of this embodiment can optionally include front curvatures in the central optical zone and the peripheral optical zone to correct for presbyopia as described herein.

DESCRIPTION

Figure 3:
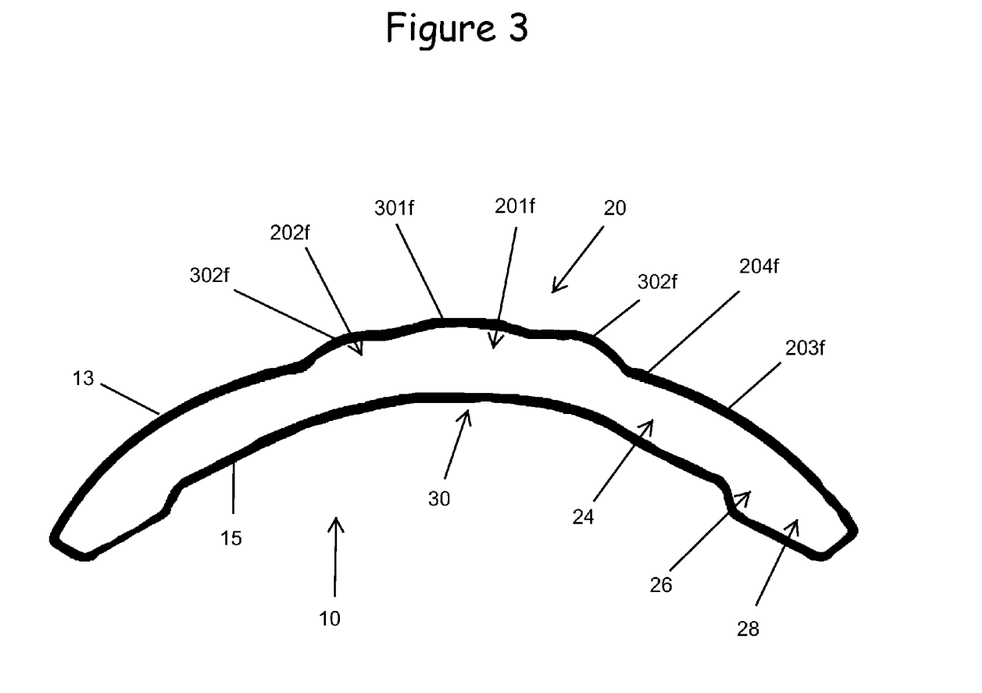
FIG. 3 is a sectional view along line 3-3 of FIG. 4 of a contact lens embodiment the present device.
Figure 4:
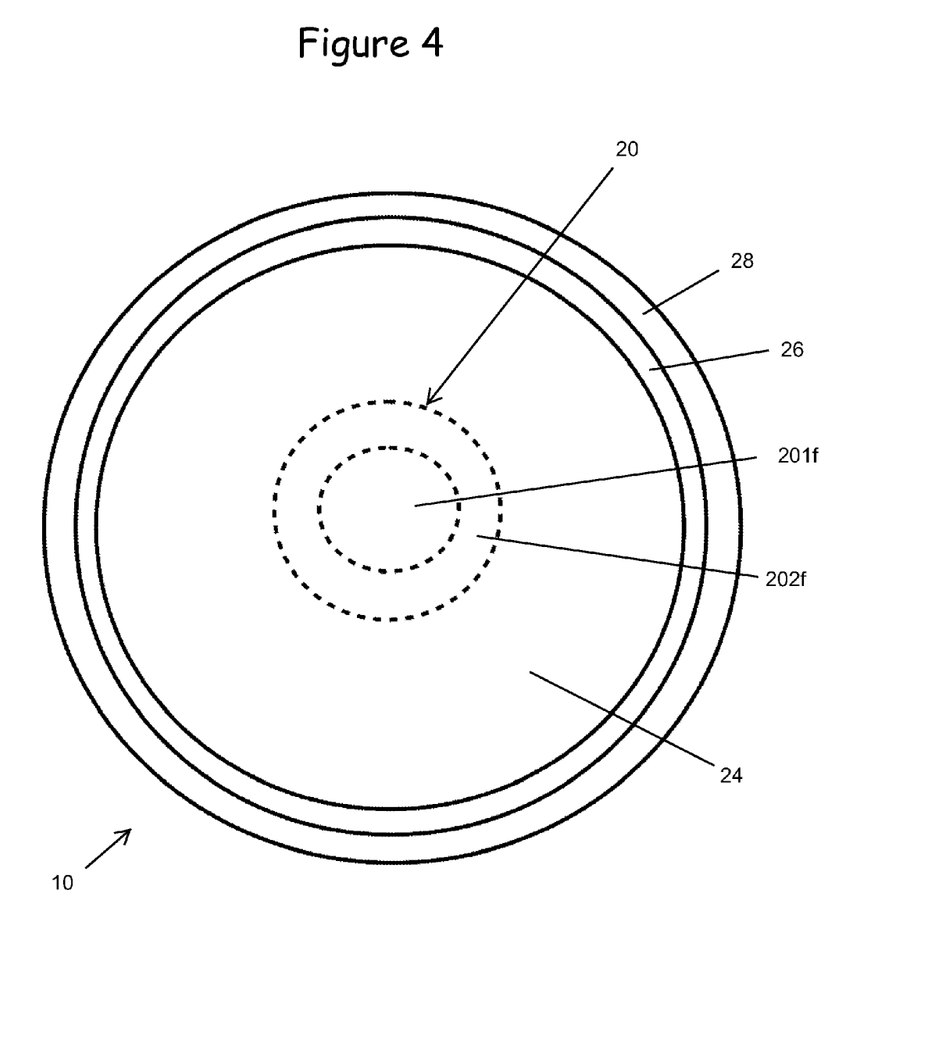
FIG. 4 is a front planar view of the PVS contact lens.

FIGS. 3 and 4 illustrate a PVS contact lens 10 according to one embodiment of the present invention. As shown in FIG. 3, the contact lens 10 is a contact lens that is adapted to be worn over the cornea 12 of a patient's eye 14. The contact lens 10 has two front optical zones 201$f$ and 202$f$, optional intermediate zone 24 and a front lenticular zone 203$f$, listed from the center of the lens 10 to the outer periphery.

Figure 5:
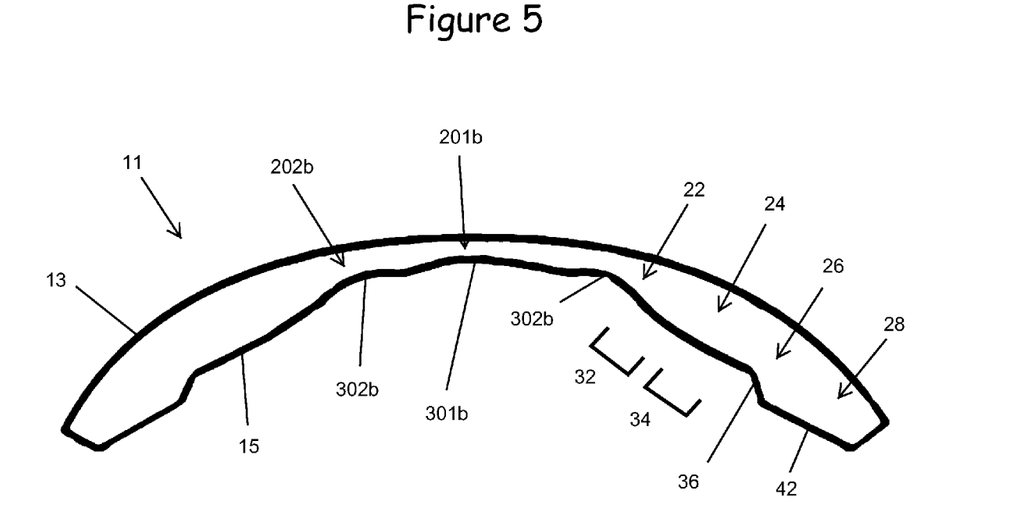
FIG. 5 is a sectional view along line 5-5 of FIG. 6 of an orthokeratology contact lens embodiment of the present device.
Figure 6:
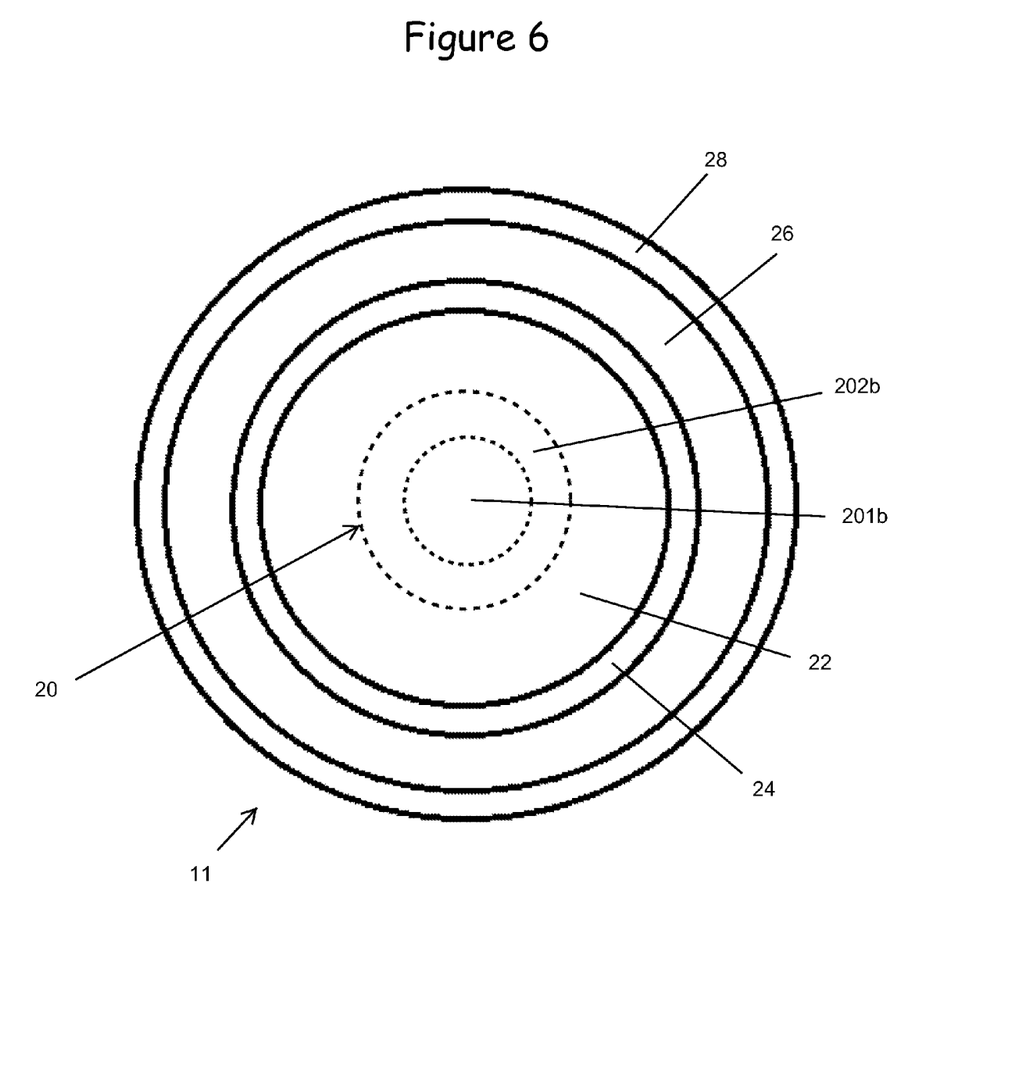
FIG. 6 is a front planar view of an orthokeratology contact lens embodiment of the present device.

FIGS. 5 and 6 illustrate a PVS ortho-k contact lens 11 according to one embodiment of the present invention. As shown in FIG. 5, the contact lens 11 is an ortho-k contact lens that is adapted to be worn over the cornea 10 of a patient's eye 14. The contact lens 11 has two back optical zones 201$b$ and 202$b$, connection zones complex 22-26 and a peripheral zone 28, listed from the center of the lens 11 to the outer periphery.

DEFINITIONS

As used herein, the following terms and variations thereof have the meanings given below, unless a different meaning is clearly intended by the context in which such term is used.

"Additional power" (ADD) is the refractive power difference between the far and near refractive powers of lenses. For spectacles, ADD is measured at a plane that is 12 mm in front of the anterior corneal surface. For any other device having a locus closer to or farther from the anterior cornea surface, the ADD is increased or reduced respectively for the distance with the vertex correction formula $Fc=F/(1-xF)$, where Fc is the power corrected for vertex distance, F is the original lens power, and x is the change in vertex distance in meters.

The "back surface" of a lens refers to the surface through which light exits the lens in its normal and intended usage. For example, for a contact lens the back surface is the surface in contact with a subject's eye when worn by the subject.

"Contact lens" is a lens placed on the exterior surface of the eye of a subject.

"Curvature" or "radius of curvature," generally measured in millimeters (mm) and referred to in terms of diopters or mm. When expressed in diopters, the curvature is determined with an appropriate refraction index. For example, for contact lenses, the refraction indices of air and tears would be taken into account along with the refraction index of the lens material in determining the curvature when expressed in diopters, while for spectacles only the indices for air and lens material would need to be used. For other lenses, such as thicker lenses or intraocular lenses, appropriate formulas and refractive indices can be used as known to those of skill in the art. Curvatures can be determined by a topographer device or radius scope using appropriate index information.

"Diopter" (D) refers to unit of refractive power that is equal to the reciprocal of the focal length (in meters) of a given lens or portion of a lens.

"Eccentricity" is a measure that defines an aspheric contour and refers to the rate of flattening of a surface of a lens, where surfaces having a higher eccentricity (e-value) flatten more quickly toward the periphery. A spherical lens has a zero e-value and a hyperbole has an e-value of one. A minus or negative e-value defines a reverse aspheric contour and refers to the rate of steepening of a surface of a lens, where surfaces having a more minus eccentricity (e-value) steepen more quickly toward the periphery.

"Focal point" is a point at which light rays originating from an object or direction converge, such as by refraction.

The "fovea" is a part of the eye, located in the center of the macula region of the retina. The fovea is responsible for sharp central vision, which is necessary in humans for reading, watching television or movies, driving, and any activity where visual detail is of primary importance. The human fovea has a diameter of about 1.2 mm-1.5 mm and subtends a visual angle of about 4-5 degrees (2-2.5° to each side of the optical or visual axis). The best correctable vision (BCVA) is about 20/20.

The "front surface" of a lens refers to the surface through which light enters the lens in its normal and intended usage. For example, for a contact lens the front surface is the surface facing outwardly when worn on the eye of a subject, in contact with the air.

"Intraocular lens" (IOL) is a lens implanted in the eye, which may replace the eye's crystalline lens or coexist with it.

"Lens" refers to an optical element which converges or diverges light, in particular to a device which is not a tissue or organ of a subject.

"Lens meters" (also known as lensometers or focimeters) are devices to measure the refractive power of eye glasses, contact lenses, or other optical lenses. Both manual and automated lens meters are known.

"LogMAR" means the logarithm of the Minimum Angle of Resolution as determined by standard charts used to assess an individual's visual acuity. LogMAR charts have equal graduation between the letters on a line as well as the space between lines. There is a fixed number of letters, usually five, on each line.

Figure 1:
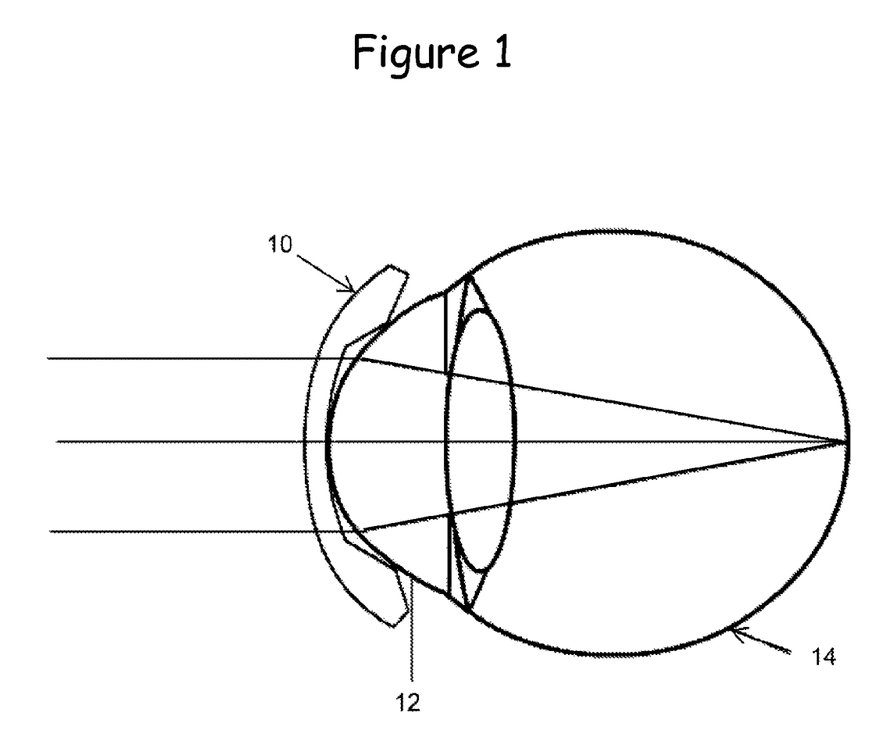
FIG. 1 is a schematic illustration of the formation of an on-axis image on the fovea of the eye.

"On-axis," when referring to light passing through a lens, refers to a direction substantially parallel to the optical axis of the lens. When light from an object enters a lens from a direction lying substantially on or parallel to the optical axis, the object is called a central object and the image formed by the lens is called a central image. In an ocular visual system, the on-axis image is conjugated to the fovea portion of the retina (as shown in FIG. 1).

Figure 2:
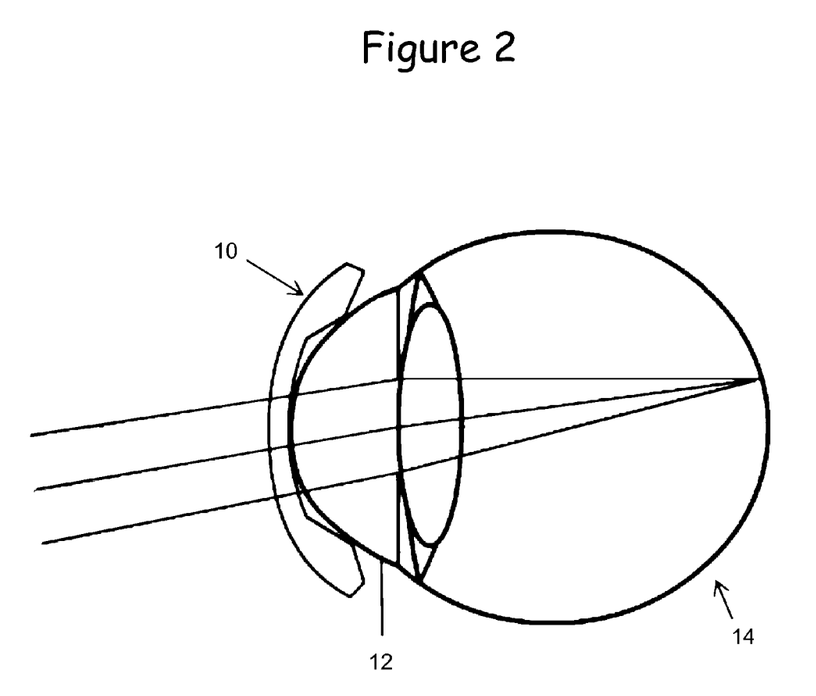
FIG. 2 is a schematic illustration of the formation of a para-axis image on the perifovea or parafovea of the eye.

"Off-axis," when referring to light passing through a lens, refers to a direction that is not substantially parallel to the optical axis of the lens, such that incoming light entering the lens deviates from the optical axis with an angle larger than zero. In an ocular visual system, an off-axis image is conjugated to the retina areas out of the fovea portion of the retina, in particular in the parafovea or perifovea areas (as illustrated in FIG. 2). An off-axis can be further defined as "para-axis" if the incoming light enters the optical device deviating from the optical axis of the system with an angle beyond 2 degrees and within 10 degrees.

The "optical axis" in an optical device, such as a lens, means a line along which there is some degree of rotational symmetry, such that the device is radially symmetrical around the line.

The "parafovea" is the intermediate area radially outward to a distance of 0.5 mm to each side and circumscribing the central fovea, where the ganglion cell layer is composed of more than five rows of cells, as well as the highest density of cones. The outmost parafovea zone subtends a visual angle of about 8-10 degrees (4-5° to each side of the optical or visual axis). The best correctable vision (BCVA) in this zone can be 20/50 (0.4 log MAR) up to less than 20/20 (0 log MAR).

The "perifovea" is the outermost region of macula found 1.5 mm to each side and circumscribing the parafovea, where the ganglion cell layer contains two to four rows of cells, and is where visual acuity is below the optimum. The outermost perifovea zone subtends a visual angle of about 18-20 degrees (9-10° to each side of the optical or visual axis). The best correctable vision (BCVA) in this zone is between 20/50 (0.4 log MAR) and 20/100 (0.7 log MAR).

"Preferential visual span" (PVS) is a locus within the visual span in which perceived codes (e.g., letters, characters and numbers) are relatively clearer and more perceivable for interpretation than in other loci of the visual span.

"Principle plane" is the refracting surface perpendicular to the optical axis. In a reduced schematic eye model, the principal plane is generally located about 5.6 mm behind the anterior cornea apex or 17 mm anterior to the central retina.

A "rigid contact lens" is one whose surface does not change shape so as to assume the contour of a corneal surface. Rigid lenses are typically made from PMMA [poly(methyl methacrylate)] or from gas-permeable materials such as silicone acrylates, fluoro/silicone acrylates, and cellulose acetate butyrate, whose main polymer molecules generally do not absorb or attract water.

"Reduced schematic eye" model for a standard human eye is a schematic eye that helps to conceptualize the optical properties of the human eye. The reduced schematic eye treats the eye as if it were a single refracting element consisting of an ideal spherical surface separating two media of refractive indices of 1.00 and 1.33. The reduced schematic eye assumes an eye power at the corneal surface of +60.00D (actual power of the Gullstrand's schematic eye is +58.60D). The anterior focal point is approximately 17 mm in front of the cornea) and the eye is 22.6 mm in length with the principle plane 5.6 mm behind the cornea.

"Refractive power" is the degree to which a lens converges (or diverges) light.

A "soft contact lens" is one that is formed from a material whose surface generally assumes the contour of a corneal surface when placed onto a cornea. Soft contact lenses are typically made from materials such as HEMA (hydroxyethylmethacrylate) or silicone hydrogel polymers, which contain about 20-70% water.

"Spectacles" or "eyeglasses" refer to a frame that holds lenses and is worn in front of the eyes. The frame is normally supported on the bridge of the nose and by arms placed over the ears.

"Spherical aberration" refers to the deviation a device or portion thereof from the focus of a perfect lens, which focuses all incoming rays to a point on the optic axis.

"Translating" bifocal or multi-focal contact lenses are lenses that have at least two separate areas or zones for far and near vision respectively.

"Visual acuity" refers to the clarity of focus provided by a particular optical system (e.g., a lens and/or a cornea of an eye).

The "visual angle" is the angle that light subtends with respect to the visual or optical axis, preferably measured from the principal plane.

The "visual axis" means a straight line extending from a viewed object through the center of the pupil of a subject to the fovea area of the retina in a human eye.

The "visual span" for reading refers to the range of letters or characters, formatted as in text, that can be recognized by a human subject without moving the eyes.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Presbyopia Correction

The previous wisdom of multi-focal devices for presbyopia can be categorized as translating or simultaneous vision multifocal. The translating multi-focal device can be in the form of spectacles or contact lenses having a far optical zone as well as one or plurality of near optical zone(s) located usually inferior to the far optical zone. To see far objects with the translating multifocal device, the visual axis has to be coincident with the optical axis of the far optical zone forming a far image at fovea area of the retina. While for near vision, the user has to realign the visual or optical axis from the far optical zone to the off-axis near optical zone of the device to form near image still at the fovea area of the retina. The far and near images are formed clearly at the fovea area in different instances without mixing focuses.

The simultaneous vision multifocal devices, usually in the form of contact lenses, may be designed with either the center of the lens for distance (CD or center distant) or with the center for near vision (CN or center near) refractive power. Multi-focal designs generally have at least two distinct zones of two different powers. However, the simultaneous multi-focal lens, having an aspheric optical zone conjugating to the on-axis optical center of the lens, forms an on-axis image at the fovea with mixing focuses contributed from both distant and near refractive powers of the lens, which contributes to form gradient blurry of the on-axis image by mixing the focused and defocused image of different refractive powers in different ratios for distant and near objects. That is to say, the optical axis of the simultaneous vision multi-focal device coincides with the visual axis of the ocular system of the eye, while forming an on-axis image at the fovea area of the retina with gradient blurry by mixing far and near focuses. The simultaneous vision lens, though more convenient for less presbyopic patients with lower ADD, is far less satisfactory in more advanced presbyopia and needs additional higher ADD for center the near zone in the CN design or may require a user to tilt the head and gaze downward to appreciate the translating effect by the peripheral ADD zone with the CD design.

The higher ADD for CN contact lenses may contribute for a higher defocusing on distant objects with excessive blurriness in distance vision.

The simultaneous vision contact lens yields a multi-focal effect by mixing near and distant focuses, which blends both far and near images into gradient blurry and might perceive codes for interpretation only through the on-axis fovea area of the retina. By contrast, the present approach to using a preferential visual span device makes use of the brain's capability of decoding off-axis, especially para-axis, words located in the parafovea or perifovea retina of the eye that is still within the scope of a visual span and is capable of being perceived by the brain for reading. In conventional simultaneous vision bifocal or multi-focal devices, the contrast between the on-axis and the para-axis (parafovea and perifovea) images is not significant enough to trigger the preferential perception or decoding of the para-axis images since they are about the same clarity or blurriness for perception at all distances.

In accordance with the methodology of the present invention, an optical device, such as a contact lens, spectacle lens, or intraocular lens, is provided with a center optical zone having a refractive power for correcting distance vision, which subtends a visual angle of about central 4-5 degrees corresponding to the 1.5 mm fovea area located about 22.6 mm behind the cornea plane of a human eye. The adjacent outward portion of the optical device further provides a near optical zone having a much shorter focal length or higher ADD to provide a near image that is much clearer than that formed by the center optical zone so that the near object triggers a preferential visual span (PVS) for reading from the para-axis area of the retina. The peripheral near zone of the optical device subtends a visual angle that is beyond the 4-5 degrees of the fovea far zone but within the central 18-20 degrees (or 9-10° to each side of optical or visual axis) corresponding to the parafovea (up to 10 degrees) and perifovea (up to 20 degrees) areas within the scope of the visual span for reading. The clarity contrast of the far and near optical zones has to be significant enough for the human brain to interpret the clearer para-axis image (words) perceived from the parafovea or perifovea portion of the retina coming from the near optical zone of the device, while neglecting the on-axis blurry image (words) perceived by the center fovea corresponding to the far optical zone of the device. The novel methodology of the invention can be used to design PVS multi-focal devices.

The BCVA declines from 20/20 at the fovea to 20/100 at the outmost portion of perifovea. The best correctable visual acuity (BCVA) has to be Snellen 20/50 (or 0.4 log Mar) or above for reading common newsprint with 1 M print size comfortably at 40 cm. If reading at a closer distance or print larger than 1 M, the BCVA can be further reduced than 20/50 for functional reading. The 1 M near vision is available for the visual span perceivable in the parafovea and perifovea areas of the retina conjugated with the near zone of the optical device with full ADD for a reading a distance of 30-40 cm. If defined by visual angle, the full near ADD of the near zone has to be off-axis but well within 2-10 degrees deviation to each side of the visual or optical axis or vision center, which is also defined as the para-axis.

The present PVS devices have to be center distant (CD) to appreciate the clear far image perceived from the center on-axis fovea area of the retina. It is usually acceptable to relocate the near center to the para-axis zones since a subnormal resolution of a minimum 20/50 BCVA is usually sufficient for near tasks. Conversely, if making the devices center near (CN) and para-axis distant, the 4-5 degrees central near optical zone would be in near focal length and the far object will form a defocused blurry image at the on-axis center fovea area of the retina. While the para-axis distant zone though in far focal length that may form clear far image at the para-axis retina area, the BCVA (resolution) of the parafovea and perifovea zones of the retina will be significantly reduced to 20/50-20/100 despite being clearly focused. Hence neither the center blurry far image nor the low resolution image perceived from the para-axis retina area in a CN simultaneous vision device would likely satisfy the vision demand of the general population for daily life.

In addition, the progressive ADD incorporated into the para-axis zones of the present devices has to be significant enough to induce desired spherical aberration and trigger image decoding from the clearer para-axis image, disregard the reduced resolution in the para-axis retina image, and override the significantly blurrier central retina image for PVS reading.

The traditional method well known to the practitioners for determination of the ADD of a lens is for a supplement of minimum plus power derived from the residual accommodation and the desired working distance of the individual. The working distance is usually set 40 cm away from eyes with a maximum ADD of +2.50D for elder ages with nearly no residual accommodation, while that for a younger ages would be less than +2.50 D depending on the residual accommodation. The traditional concept of minimum ADD aforementioned in presbyopia correction is granted for on-axis reading or perception from the central fovea using a translating or simultaneous vision device. While reading with the present PVS device, the on-axis image passing through the far optical zone focusing on central fovea will be relatively blurry. The phenomenon of "on-axis blurry" increases with age and parallels the degradation of accommodation power. The para-axis image incoming from the near optical zone of the PVS device has to be much clearer than the on-axis blurry image to enhance the PVS perception for reading. The para-axis PVS images may function to override the on-axis fovea image for reading only when the focal length in para-axis zone is at least +2.00 to +4.0 D shorter (stronger) than the on-axis zone. The excessive ADD incorporated into the off-axis near optical zone relaxes the residual accommodation, which moves the center on-axis near image falling behind the retina due to presbyopia farther backward, for significant blurriness, while moving the para-axis near image forward onto the para-axis retina for a clearer image that may trigger meaningful perception or decoding through the para-axis retina area and disregard the worse resolution of the para-axis area.

It is also critical to know the visual angle, the field size and the image size to determine how the incoming light rays may form an image on appropriate retina areas for executing PVS multifocal vision. The visual or optical angle conjugated to a principle plane can be calculated by the well known formula: $\theta=2*\arctan(S/2D)$, where $\theta$ is the visual angle; S is the linear size of the object; and D is the distance from the object to the principle plane of the eye. For smaller angles, the image size or retina zone width conjugated to principle plane of a human eye can be figured by the formulas: image size $I=[(2*\pi*d)*\theta]/360$, where d is the distance from the principle plane to the retina, and $\theta$ is the subtended visual angle of the object. Alternately, it can also be estimated by image size $I=[2*(\arctan(\theta/2))*d]$. The image or entrance field should be conjugated forward or backward from the theoretical principle plane located approximately 5.6 mm behind the front surface of the cornea apex or 17 mm in front of central retina for a 22.6 mm standard human eye. The axial length may elongate 1 mm for every −3 D myopia progression, which may also slightly increase the image size, while usually insignificant for designing the devices.

Furthermore, if the present optical device is a contact lens, the visual angle of the retina areas can be conjugated to a zone width on a contact lens or corneal plane that is located 22.6 mm in front of the fovea or 5.6 mm anterior to the principle plane. If the optical device is spectacles, the visual angle can be conjugated to a zone width on spectacles that is positioned 12 mm in front of the cornea, 17.6 mm in front of the principle plane or 34.6 mm in front of the retina. To conjugate the zone width to visual angle, one degree is 1/360 of a circle, which is conjugated to the 17.5 mm zone in 1 meter distance, or the 7 mm zone in 40 cm reading distance, or 0.31 mm zone in spectacles distance that is 17.6 mm in front of principle plane, or 0.1 mm zone on cornea or contact lens surface that is 5.6 mm in front of the principle plane.

Hence mathematically, the 4-5 degree span of the fovea is conjugated to a 0.5±0.1 mm zone on the contact lens plane or 1.55±0.2 mm zone on the spectacles plane. The 9-10 degree span of the parafovea then is conjugated to a 0.85±0.1 mm annular zone on the contact lens or 2.6±0.3 mm annular zone on the spectacles' plane. The 18-20 degree span of the perifovea is conjugated to a 1.8±0.2 mm annular zone on the contact lens plane or 5.5±0.5 mm annular zone on the spectacles' plane. The zone conjugated to the fovea area forms the far optical zone, while the annular zone conjugated to the parafovea and perifovea area of the retina forms the near optical zone on the PVS device. The annular zone is not limited to being a round circle. It can be any shape that conjugates to each side of the visual or optical axis for the desired visual angle to have PVS function. It is then very straightforward to design the optical devices to enable the preferential visual span for reading, based upon the conjugated zone widths, refractive powers of near and distance vision, and respective BCVA.

With reference to FIGS. 3 and 4, the on-axis portion or the central optical zone of the PVS multi-focal system, having a spherical power for correcting distance vision, is that of zone 201*f* in contact lens 10, which coincides with the visual or optical axis of the ocular system of eye 14 and forms an on-axis far image at the fovea area of the retina in eye 14. The para-axis area of the PVS multi-focal system, having sufficient ADD for near vision, is that of zone 202*f* in contact lens 10, which coincides with the para-axis entrance field of the ocular system of eye 14 and forms a para-axis near image at the para-axis (parafovea and perifovea) areas of the retina in eye 14. The far and near images are conjugated to adjacent but separate portions of the PVS multifocal devices, and also to the individual entrance fields of the ocular system of eye 14, while they also form far and near images in adjacent but separate retina areas in eye 14. The loci, field widths as well as the significant power difference in far and near optical zones of the PVS multifocal devices contribute to enable the separation of far and near images for perception in adjacent but distinct retina areas of the eye 14, without mixing focuses for gradient blurry as that in simultaneous vision lenses. While the concept of separating images in adjacent but distinct fields in the PVS multifocal system also improves the inconvenience of repetitive realignment of the visual axis aiming through the far and near optical zones in translating multifocal devices.

The three retina landmarks, the fovea, parafovea and perifovea retina areas are important for the PVS multifocal devices. Table 1 below demonstrates a few exemplative on-axis loci with their corresponding zone widths conjugated to the principle plane of the eye for the three retinal landmarks.

The illustrated zone width of each locus is derived from the visual angles conjugated to the principle plane of the eye, individually for the fovea (4-5° or 1.5 mm), parafovea (9-10° or 2.5 mm) and perifovea areas (18-20° or 5.5 mm) of a standard human eye having an axial length of 22.6 mm. The subtended visual angle, the zone or field widths and the loci, may change slightly with any possible axial lengths in a human eye that is well known to the practitioners. For additional applications of PVS multifocal devices, such as IOL, the zone width for the optics of the devices can be derived from the position of the locus and the subtended visual angle for the fovea, parafovea and perifovea areas respectively.

TABLE 1

| Locus to principle point (distance/ zone width) | Retina (17 mm) | Cornea (5.6 mm) | Spectacle (17.6 mm) | Reading 40 cm | Far plane 6M | BCVA |
|---|---|---|---|---|---|---|
| Fovea 4-5° | 1.5 ± 0.1 mm | 0.5 ± 0.1 mm | 1.55 ± 0.2 mm | 35 mm | 527 mm | 20/20 |
| Parafovea 9-10° | 2.5 ± 0.1 mm | 0.85 ± 0.1 mm | 2.6 ± 0.3 mm | 58 mm | 875 mm | ~20/50 |
| Perifovea 18-20° | 5.3 ± 0.4 mm | 1.8 ± 0.2 mm | 5.5 ± 0.5 mm | 124 mm | 1862 mm | ~20/100 |

The gradual change of the near and far focal points and the induced spherical aberration of the PVS multifocal device on a human eye, can be detected objectively using a commercially available auto-refractor (e.g. Shin-Nippon auto-refractor, Nidek-OPDIII) for mapping the focal points to the desired on-axis and off-axis visual angles of the ocular and optical device.

A binocular testing instrument that can dissociate the images between two fellow eyes for a fusion test can be used to prove whether the PVS device is effective for reading at para-axis (parafovea or perifovea) zones subjectively. One of these devices is the Keystone view vision tester (available from Mast Concepts, Reno, Nev.) that uses an infinity septum to separate the binocular vision for testing the associated or dissociated phoria as well as usable vision. The device may show how on-axis fovea vision with one eye of a user, wearing the PVS device, compares with the vision of the user's other eye while reading at para-axis zones is clearer than is anticipated in a PVS device for reading as described herein.

It might rarely happen that some binocular misaligned patients may respond poorly to the present PVS device. For example, in an exophoria (squinting outward) patient, if the misalignment is so severe that the binocular fovea correspondence has been compromised to be in exo-fixation disparity, i.e. the on-axis fovea center has been displaced nasally, the patient probably will not be able to appreciate a PVS device set for reading in an off-axis zone that has been further displaced to a retina portion that is too scarce in cone cells and has not enough resolution for reading. It is highly recommended that binocularly dysfunctional cases be tested for any existing fixation disparity or associated phoria angles, using commercially available binocular vision devices or testers, before fitting PVS devices.

Considering the aforementioned image axis and the visual axis of the eyes that have to be conjugated to each other, the present devices for PVS have to move with the eye to keep a constant alignment or deviation of the images relating to the visual axis. The preferred devices for PVS are therefore intraocular lenses (IOL), intracorneal lenses (ICL), contact lenses (soft or rigid), and ortho-k molding lenses (CRT or OK lenses) and refractive corneal surgical devices with software programs for reshaping the cornea contour into distinct or progressive far and near zones for PVS.

Myopia Retardation (MR)

Multifocal devices can be useful in slowing the progression of near sightedness, i.e. myopia retardation. There are two parallel vision pathways, the P- and M-pathways, conveying the cone image to the LGB (Lateral Geniculate Body) before being interpreted by the cerebral cortex. The Parvocellular or Sustained P-pathway primarily carries detail and color information. The Magnocellular or Transient Motion, M-pathway carries motion information in the same area of the visual field. The M-pathway with motion images is responsible for arousal of the sustained P-pathway for steady, color center images to be interpreted by the cerebral cortex. If a subject can hold his eye very still in viewing a target, that is, no motion from what he sees, the image would fade: the physiological phenomenon is called Troxler's fading. Troxler's fading is also detected to accompany complete accommodation relaxation. The faded image reappears instantly with motion or activation of the M-pathway and the accommodation will be also fully resumed in the same moment. The average length of the Troxler's fading varies from an estimate of just over 3 to 6 seconds.

In a pathological status, the ICS (intermittent central suppression), defined as "an involuntary, temporary suspension of vision in one or both eyes", is observed to be closely associated with dyslexia. ICS, being a pathological version of Troxler's fading, is recognized as a repetitive loss of visual sensation in the central area of vision without strabismus or amblyopia. ICS can be detected as a loss of detail (acuity) in a non-moving test target. The central vision will be suppressed for an average of two to five seconds, two or more times per ten seconds. The image fading-reappearance cycles may happen only in one eye (constant-ICS) or alternately between two eyes (alternate-ICS).

It is common for young children or adolescent patients suffering from constant-ICS to also develop intractable anisometropia (above 2-5 D) such that their myopia worsens much faster unilaterally. It is always the eye that is not affected by ICS (non-ICS eye) that becomes more myopic while the ICS eye stays emmetropic, hyperopic or less myopic with better distance vision. In children with constant-ICS, the non-ICS eye may be more apt to develop myopia and then worsen in normal pace, while the ICS affected eye is generally more resistant in developing myopia. This is believed to be the result of frequent relaxation in accommodation and/or reduced M-pathway activity in the ICS eye, because the ICS eye gets intermittent, full relaxation of accommodation accompanying the transient fading of an image, which may in turn relieve ocular stress and/or trigger less globe elongation due to less M-pathway activity.

The M-pathway and/or its activity is most abundant in fovea area and fades rapidly outward to the peripheral portion of the retina. In view of this, the present devices (preferably but not limited to PVS multifocal contact lenses) can be used to slow the progression of myopia by relocating the reading center to the parafovea or perifovea areas, in order to achieve the goal of reducing the M-pathway activity and/or relaxation of accommodation without inducing ICS. The para-axis PVS images in this way function to override the on-axis fovea image for reading only when the focal length in the para-axis zone is at least +2.00-+4.0 D shorter (stronger) than in the on-axis zone. The extra ADD incorporated into the off-axis near optical zone relaxes the accommodation, which moves the center on-axis near image backward with significant blurriness, while pulling the para-axis near image forward to the para-axis retina area for a clearer image that may trigger meaningful perception or decoding through the para-axis retina area. The present devices can also be used in conjunction with some long acting cycloplegics (e.g. atropine) for myopia retardation, as well as to improve the near vision seriously compromised by the long term use of atropine.

Multifocal Lenses

FIGS. 3 and 4 illustrate contact lenses 10 designed according to the present invention that can be soft or rigid contact lenses formed from standard contact lens materials. As shown in FIGS. 1-2, the contact lens 10 is adapted to be worn over the cornea 12 of a patient's eye 14. As shown in FIG. 3, the contact lens 10 has at least three correction zones on the convex front surface 13 of the contact lens 10, listed from the center of the lens 10 to the outer periphery: a center (far vision) optical zone 201f, a peripheral (near vision) optical zone 202f, and intermediate zone 24 which can be a lenticular zone. The concave back surface of the PVS contact lens can be a conventional spherical lens, an aspheric lens, or dual geometry and reverse geometry design as taught in U.S. Pat. Nos. 6,652,095; 7,070,275; and 6,543,897 for ortho-k RGP (rigid gas permeable) lenses.

The optical zone 20 has a back surface that is defined by the base curve 30, and a front surface that is defined by the front optical curves 301f and 302f. The front optical zone 20 in the present invention is divided into at least two concentric zones. The inner portion of the optical zone 20 is the central or far optical zone 201f with a front optical curve 301f, and is designed with a refractive power for correcting distance vision. The outer portion of the optical zone 20 is the peripheral or near optical zone 202f with a front optical curve 302f, and is designed with a refractive power for correcting near vision. The difference between far and near refractive powers is the addition power (ADD) for reading.

Although it is possible to create two adjacent annular zones for far and near powers respectively, distinct small zones with a significant difference in ADD power and having an abrupt junction may sometimes induce image jump, confusion or double vision. In a preferred embodiment, the two zones 201f and 202f are therefore merged with a continuous reverse-aspheric curvature for a smoother transition in spherical aberration. To execute the present lens for reading, the near optical zone 202f has to be off-axis and merged into the maximum ADD power area of a contact lens within a diameter of 3-5 mm from the center of the lens or 1.5-2.5 mm to each side of the visual or optical axis. More preferably, the near optical zone 202f is merged within a 4 mm diameter or 2 mm to each side of the visual or optical axis.

The near optical zone 202f is usually set double in size, or 1 mm larger to each side of the 1.8±0.2 mm para-axis cornea zone of the cornea 12 that is required for forming para-axis retina image for PVS reading. Hence, the front optical zone 20, including zones 201f and 202f, is preferably about 3-5 mm, more preferably 4 mm, in zone width, or 2 mm to each side of the geometric center, and has a progressively steeper reverse-aspheric front optical curvature 301f and 302f, respectfully, radially outward from the geometric center of contact lens 10. The maximum ADD power for the outermost (most peripheral) margin of near optical zone 202f, preferably about +4 to +8 D, is also preferably set two times stronger than what is required for PVS reading (about +2 to +4 D, such as +3D). Then the front far optical zone 201f and front near optical zone 202f can be merged smoothly, for a continuous front optical zone 201f-202f with a reverse-aspheric front optical curve 301f-302f to ensure a clear central far image forming at the fovea area of the eye 14, and an adjacent near image forming at the para-axis (parafovea and perifovea) area of the eye 14 for PVS reading, to eliminate image jump or overlapping focuses with two distinct zones.

The ADD power available from a back aspheric contact lens is far less than that from a reverse-aspheric design on front surface of the contact lens 10 considering the difference in refraction index of the media, tear (n=1.3375) vs. air (n=1.0) respectively, so the near zone refraction in most cases will not be solely accomplished by the back curvature of the present lens. The majority of the add power for the present contact lenses 10 will in most cases be incorporated in a front optical curve, i.e. the curve 301f for the far zone and the curve 302f for the near zone. The curve 302f is steeper than curve 301f (i.e., it has a smaller base curves), of which the two zones can be merged into a continuous curve radially steeper outward and defined as a reverse-aspheric curve. The reverse-aspheric front curve can be further defined mathematically as having a minus or negative e-value that is the minor curve of the aspheric back curve having a positive e-value for the same e-value.

To facilitate a PVS for reading, the ADD power or the negative e-value of the reverse-aspheric curve should be much higher than what is expected in traditional bifocal or multi-focal devices for a higher spherical aberration within the para-axis near optical zone 202f. The traditional bifocal or multi-focal contact lenses usually create the near optical zone for an ADD power obtained from refraction examination or estimated by age. For a reading distance of 40 cm, the maximum ADD is generally +2.50 for older adults without any residual accommodation. The required ADD power for younger ages having useful residual accommodation would be less than +2.50 D.

While reading with the present contact lens 10, the on-axis image passing through the far optical zone 201f and focusing on the central fovea will be relatively blurry. The para-axis image coming from the near optical zone 202f of the contact lens 10 has to be much clearer than the on-axis blurry image to enhance the PVS perception for reading. The para-axis PVS images will generally override the on-axis image for reading when the focal length over the 1.8±0.2 mm para-axis near optical zone is at least +2.00 D shorter (stronger) than that of the on-axis far optical zone 201f at the corneal plane as aforementioned. Preferably, the ADD on the outermost (most peripheral) margin of the near optical zone 202f, which is set to be larger for a smooth transition, is at least +3D, more preferably +4 D, disregarding the patient age, while even more preferably it can be +5 D to +6 D for older adults with heavy near work. For some extreme designs, +8 D or +10 D of ADD to the outermost margin of the near optical zone 202f is acceptable especially for a PVS contact lens 10 made in soft and pliable materials such as hydrogel (HEMA) or silicone-hydrogel that centers extremely well with little movement.

Image jump is a concern in creating two distinct annular zones on front optical curve 30f with a +4 to +6 D difference between curvatures 301f and 302f of the two zones. The image jump can be resolved by merging the two zones with a reverse-aspheric front optical zone curve 301f-302f that becomes steeper and steeper radially outward. The formula to calculate the negative e-value for merging the two zones is e=−SQRT((RA^2−RB^2))/(ZoneA+ZoneB), Herein, the RA is the radius of curvature for far power and the RB is the radius of curvature for near power. (ZoneA+ZoneB) is the half zone width of the two annular zones of far optical zone 201*f* and near optical zone 202*f*. The stronger ADD assigned to the outermost margin of the near optical zone 202*f* then defines the negative e-value merging the far optical zone 201*f* to near optical zone 202*f* to form a continuous, progressive reverse-aspheric far-near optical zone 201*f*-202*f* for executing the PVS multifocal effect for reading in para-axis retina areas (e.g. parafovea and perifovea).

The negative e-value for merging the two front optical zones 201*f* and 202*f* with +4 to +6 D power difference is usually −0.7--3.0 e using contact lens materials having refraction index of about 1.4 to 1.6, which may induce excessive positive spherical aberration in the far object and incur blurry or ghosting images in dim light when the pupil is dilated. To avoid inducing excessive spherical aberration, the contact lens 10 has to be precisely centered for the fovea to perceive light rays from the far optical zone 201*f* only for less spherical aberration. In our clinical tests, the dual geometric design for RGP taught in U.S. Pat. Nos. 6,652,095 and 7,070,275 for the back curvature works best for lens centration. It is also helpful to design a contact lens 10 having aspheric back optical zone curvature (BOZR) which may contribute to the ADD power while for less positive aberration. A lenticular curve 203*f* in the intermediate zone 24 on the front surface outward to the near optical zone 202*f* may contribute to preventing peripheral light from entering the center fovea and hence reduces aberration. The curvature of the lenticular curve 203*f* is set for a proper edge thickness and usually steeper than the front optical zones 201*f* and 202*f* in higher myopic PVS contact lenses 10, and flatter than the optical zone 201*f* and 202*f* in low myopic, emmetropic or hyperopic PVS contact lenses 10. The curvature can be determined by the sagittal depth calculation for edge thickness that is well known to the skilled contact lens designers.

Myopic contact lenses tend to get thicker toward the peripheral edges with higher powers. To reduce the peripheral edge thickness of the present PVS contact lenses, a lenticular curve 203*f* steeper than the curves of zones 201*f* or 202*f* can be incorporated radially outwardly to the front near optical zone 202*f*. Contrary to the myopic lenses, the emmetropic, low myopic or hyperopic PVS contact lenses 10 may get too thin at their edges and thus crack or chip more easily than is desirable, so to increase the peripheral edge thickness of the PVS contact lenses 10, a lenticular curve 203*f* that is flatter than the curves 301*f* or 302*f* can be incorporated radially outwardly to the front near optical zone 202*f*.

One or more optional intermediate zones within zone 24 with a half zone width of 2.0-5.0 mm radially outward can also be added between the front near zone 202*f* and a lenticular curve 203*f* for optical or therapeutic reasons. For example, the intermediate zone 24 can be added for the same correcting power of the far zone 201*f* that may further enhance the peripheral far incoming light for better distance vision in the night time. The intermediate zone 24 can also be a very steep zone forming a further steeper ridge that is 1-30 D steeper than the front near optical zone 202*f*.

The present contact lens 10 can also simulating the treatment zone of a cornea after myopic orthokeratology molding. The ablation like treatment zone of the cornea after myopic orthokeratology is well known for its potential in myopia retardation, and this can be combined with the myopia retardation of the present lens. The contact lens 10 can simulate orthokeratology molding for immediate myopia retardation without waiting for molding courses. The contact lens 10 for simulating ortho-k treatment zone can be made in rigid or soft contact lens material. However, it is more preferable made in soft contact lens material that is pliable, covering whole area of the cornea 10 and extending beyond the limbus to the adjacent sclera area of the eye 14, for better centration with little movement to ensure a stable PVS multifocal vision. It is a novel invention to design a contact lens 10, preferably but not limited to using a soft contact lens material, for simulation of an ortho-k treatment zone for myopia retardation without cornea molding.

In this embodiment, the front surface of the myopic PVS contact lens 10 for simulating the treatment zone of a post orthokeratology cornea 12, for helping presbyopic correction and myopia retardation, can have the following 3-4 front optical zones listed from the center of the lens 10 to the outer periphery: a flatter far optical zone 201*f* for correcting distance vision, a near optical zone 202*f* that is +2 to +4 D steeper than the far optical zone 201*f* for PVS vision, an optional intermediate zone 24 having a front curvature 204*f* that is further steeper than the near optical zone 202*f* to form a steep ridge, and an optional lenticular zone 203*f* for controlling the edge thickness by sagittal calculation, which is well known to those skilled in the art. The far and near optical zones 201*f* and 202*f* are preferably merged with a reverse aspheric curve for a smooth transition. The ADD assigned for the outermost margin of the near optical zone 202*f* is illustrated but not limited to +4-+8 D. An ADD up to +10 D is possible if the near optical zone 202*f* is indicated for use in cases with heavy demand in near work.

The far and near refractive powers of the present PVS contact lenses 10 are also preferably incorporated to the front surface of the contact lens 10 and merging the front far optical zone 201*f* and near optical zone 202*f* with a reverse-aspheric curvature having a negative e-value. The posterior contour of the contact lens 10 can be any of a conventional contact lens design, aspheric contact lens or more preferably, incorporating the dual geometric or reverse geometric designs, which has been disclosed in U.S. Pat. Nos. 6,652,095; 7,070,275; and 6,543,897, for better centration on eye 14.

Orthokeratology Contact Lenses

FIGS. 5 and 6 illustrate a PVS ortho-k contact lens 11 designed according to the present invention. As shown in FIG. 5, the contact lens 11 is an ortho-k contact lens that is adapted to be worn over the cornea 12 of a patient's eye 14 to reshape the cornea into a PVS shaped cornea 12 for reading. As shown in FIG. 5, the contact lens 11 preferably has at least three to four correction zones on the back or posterior surface 15 of the contact lens 11. As listed from the center of the lens 11 to the outer periphery, the zones can be: a far optical zone 201*b* having a curvature of 301*b*, a near optical zone 202*b* having a curvature 302*b*, a connecting zones complex 22, 24, and 26 having curvatures 32, 24, and 36 respectively and a peripheral zone 28 having a curvature 42. There can be a plurality of connecting zones 22-26 between the near optical zone 202*b* and the peripheral zone 28. The back surface of the PVS ortho-k contact lens 11 can be a dual geometry and reverse geometry design for orthokeratology as has been taught in U.S. Pat. Nos. 6,652,095; 7,070,275; and 6,543,897.

The back surface of the present ortho-k contact lens 11 has to exert forces to create the PVS shape on a cornea. The back optical zone (BOZ) of a PVS orthokeratology or ortho-k contact lens 11 is therefore designed to impart on a subject's cornea a shape or conformation as described above for the front surface of a PVS multi-focal contact lens 10, having adjacent far and near optical zones. The central (far or distance vision) optical zone 201*b* is located at the central portion of the contact lens 11 for orthokeratology, having a far base curve 301*b* that is flatter or steeper than the cornea curvature of the cornea 12 for the target power, in reshaping the front cornea surface of the cornea 12 for a central far corneal zone, in correcting the ametropia, including but not limited to myopia, astigmatism, and hyperopia. Preferably, the base curve 301b is designed to provide a subject with a visual acuity of between −0.3 and 0.3 LogMAR in the center portion of the subject's cornea in the absence of the contact lens. There is also an annular peripheral (near vision) optical zone 202b radially outward from the far optical zone 201b of the contact lens 11, having a near base curve 302b that is steeper (having a smaller radius) than the far base curve 301b for a contour that is required for steepening the para-axis near corneal zone on cornea 12 and forming para-axis retina image for PVS reading.

However, the cornea molding is not just printing the back optical zone curves on cornea 12 for a mirror image. The other portion of the back contour of the contact lens 11 has to be fitted properly on the cornea 12 for centering the contact lens 11 as well as exerting appropriate forces for tissue molding to help form the multifocal PVS zones on the center portion of the cornea 12. U.S. Pat. Nos. 6,652,095 and 7,070,275 for example teach the molding of a center button on the cornea 12 for a center near (CN) simultaneous vision multifocal. Knowing the new concept of PVS for reading, we can adapt such ortho-k contact lenses 11 to mold the cornea 12 for center distant (CD) vision instead with a para-axis PVS near optical zone for reading. The CD molding will be superior in distance vision without the interference of a center near button in CN molding. The change can be made for a myopic or a hyperopic multi-focal ortho-k lens 11.

To reshape corneas 12 for executing PVS for reading, the near optical zone 202b has to be off-axis and merged for a maximum ADD power in an area well within 3-5 mm in diameter, or 1.5-2.5 mm to each side of the visual or optical axis. More preferably, the near optical zone 202b should be within 4 mm in diameter or 2 mm to each side of the visual or optical axis. Although it is possible to create two adjacent annular zones for far and near powers respectively, a better alternative is to merge the two zones with a continuous reverse-aspheric curvature of 201b-202b, having negative e-value for smoothing out the critical changes between the far optical zone 201b and near optical zones 202b of a PVS orthokeratology contact lens 11.

The well-known sagittal calculation for designing the orthokertology lenses is applicable for designing the PVS ortho-K contact lens 11 for exerting molding forces and lens centration (see, ADVANCED CL FITTING, PART SEVEN, TRENDS IN MODERN ORTHOKERATOLOGY, Optician, No. 5645, Vol. 215, Apr. 3, 1996, pages 20 24). An orthokeratology lens for molding myopia usually has a base curve much flatter than the central cornea curvature to bear the central portion of the optical zone on the cornea for hydraulic massage. In PVS molding, the center far optical zone 201b can bear properly on the center cornea for forming a distance vision (far) corneal zone, while lifting off radially outward to become less and less bearing on the para-axis portion of the cornea 12 for forming near vision corneal zone. It is a novel invention to create the para-axis near optical zone 202b much steeper than the center far optical zone 201b for about +2-+8 D, or preferably in a reverse-aspheric contour, to reduce the annular para-axis sagittal height for bearing the near optical zone 202b properly on the para-axis portion of the cornea 12 for reshaping it into a desired PVS contour. The negative e-value for merging the two back optical zones 201b and 202b with +2 to +8 D power difference is usually −0.8 to −3.5 e for creating the reverse-aspheric shape to bear on a cornea 12 having average refraction index of 1.336-1.3375. The ADD added to the near optical zone 202b is not for optical purposes as with the near optical zone 202f of the contact lens 10, but for reducing the annular sagittal height of the near optical zone 202b and bearing the annular near optical zone 202b on the para-axis portion of the cornea 12 for reshaping a near corneal zone on cornea 12 for PVS reading after removing contact lens 11. The ADD incorporated to the para-axis near optical zone 202b of the contact lens 11 for a steeper near base curve 302b, conversely making the near optical zone 202b less plus or more minus in refraction power than the far optical zone 201b. The paradoxical phenomenon is well known for the refraction indices between different interfaces of air, tear and lens materials. It is important to off-set the paradoxical minus ADD by incorporating a front reverse-aspheric zone on front surface for better vision, as that of the zone 201f-202f in contact lens 10, for a better vision while wearing the contact lens 11 during awakening hours.

The very steep near optical zone 202b, on the back surface of the PVS ortho-K contact lens 11, may bear too tightly on the para-axis cornea zone underneath the near optical zone 202b, especially in lenses for low myopia or hyperopia, and this has to be off-set with a much flatter connecting zone 22 adjacent and radially outward to the near optical zone 202b. The inner connecting zone 22, usually flatter than the near optical zone, can also contribute to highlighting the steepening of the para-axis cornea zone of the cornea 12 for a steeper near corneal zone for PVS reading. Hence, the PVS ortho-K molding contact lens 11 can be simplified to a typical feature of flat-steep-flat-steep contour for the flatter far optical zone 201b, a progressively steeper near optical zone 202b with +2-+8 D ADD at its outermost junction, then radially outward connecting to a flatter first connecting zone 22, then to the else connecting zones 24 and 26, and further connecting outward to the peripheral zone 28.

The near optical zone 202b is usually set 1 mm wider to each side of the 2 mm para-axis cornea zone of the cornea 12 than is required for forming para-axis retina image for PVS reading. Hence, the optical zone 201b-202b is about 4 mm in zone width, or 2 mm to each side of the geometric center, having a progressively steeper reverse-aspheric optical zone curvature 301b-302b, radially outward from the geometric center of contact lens 11. The maximum ADD power for the outermost margin of near optical zone 202b (about +2-+8 D) is also set stronger than, and preferably twice as strong as, that which is required for PVS reading (about +2-+4 D). Then the far optical zone 201b and near optical zone 202b can be merged smoothly, for a continuous optical zone 201b-202b with a reverse-aspheric curvature 301b-302b for reshaping the central area of the cornea 12 for a central far zone conjugating to the fovea area of the eye 14, and an adjacent near zone conjugating to the para-axis (parafovea and perifovea) area of the eye 14 for PVS reading, without image jump or overlapping.

Referring to FIGS. 5 and 6, the connecting zones complex 22, 24 and 26 is positioned adjacent to and radially outward from the near optical zone 202b. The innermost connecting zone 22 is preferably flatter than the near optical zone 202b for 1-10 D and can be considered a plateau zone, as disclosed in U.S. Pat. No. 6,652,095. The plateau zone 22 can have a radius of curvature defined by a predefined plateau curve which is longer (i.e., flatter) than the radius of curvature associated with the base curve of the optical zone 20. The flatter plateau zone 22 preferably merges with the flatter outer optical zone 20 and can be looked upon as a continuous and gradual-flattening curve with positive e-value.

This longer radius of curvature of the plateau zone 22 defines a plateau curvature 32 that is flatter (longer radius) than the measured curvature of the central portion of the cornea 12 and the measured curvature of the portion of the cornea 12 circumscribing the central portion of the cornea 12. The plateau zone 22 functions as a primary compression force to the mid-peripheral cornea region substantially surrounding the apical central cornea between the optical zones 20 and the fitting zone 24 in ortho-k embodiments of the present lens 11. The plateau zone 22 is preferably kept as narrow as possible, so that it can function as a compression zone for mid-peripheral cornea flattening. The flattened mid-peripheral cornea will in turn enhance the central cornea 12 for further steepening. The molding technique is named "dual molding" which includes a positive molding for central cornea steepening and a negative molding for mid-peripheral cornea flattening. The lens design can also be named a "dual geometric lens" which include a positive geometric zone and a negative geometric zone for the steeper optical zone and flatter plateau zone respectively. A narrow flattened mid-peripheral cornea area coupled with a large steepened central and juxta-central cornea area will prevent a subject from being bothered by ghost images in far vision.

The plateau zone 22 preferably performs three primary functions. First, the plateau zone 22 allows an effective compression on mid-peripheral cornea to push the cornea tissue inward, which in turn steepens the cornea curvature of the central portion of the cornea 12. This represents the positive molding component of the "dual molding". The compression force exerted by the flatter plateau zone 22 on mid-peripheral cornea portion will be far more effective for tissue molding than the compression force by traditional method of a series of steeper regular RGP. The compression force by a steep fit regular RGP is exerted on more peripheral cornea and is more tangential to the compressed area, so that most of the molded tissue will pile up at mid-peripheral area instead of the central area to cause an adverse effect.

Second, the plateau zone 22 functions as a compression zone for the effective flattening of the mid-peripheral area surrounding the steepened central cornea area 12. Forming a plateau shape on the mid-peripheral area of the cornea 12 by the compression force of plateau zone 22 will in turn enhance the steepening effect of the central cornea. The negative molding component of "dual molding" flattens the mid-peripheral cornea 12 and effectively enhances the positive molding of steepening the central and juxta-central portion of the cornea 12. The flatter plateau zone will also prevent the cornea tissue, which is squeezed inward by the alignment zone 26 (described later), from piling up at the mid-peripheral area. Piling up of the cornea tissue on the mid-peripheral area would have adversely flattened the central cornea curvature and increased the hyperopia, instead of reducing it. This is one of the problems that conventional orthokeratology frequently encountered.

Third, the flat plateau curve of the back surface of the plateau zone 22 reserves more room for the vertical height of the fitting zone 24 so that the fitting curve can be fitted much steeper than the plateau curve 32. This allows the fitting curve to form a space for proper tear circulation and a room for tissue molding before connecting to the alignment zone 26. In one embodiment of the present invention, the diameter of the plateau zone 22 ranges from 0.1 mm to 2.0 mm. The radius of curvature for the plateau curve 32 is flatter (longer radius) than the central base curve 301b or peripheral base curve 302b by 3-60 diopters, and is usually between 8-25 diopters.

Further connecting zones 24 and 26 for contact lens 11 may be considered a combination of a fitting zone, facilitating zone and alignment zone disclosed in U.S. Pat. Nos. 6,543, 897 and 6,652,095. However, the sagittal depth of the connecting zones complex 22, 24, and 26, in accordance with the present invention, is determined for bearing the contact lens 11 on the peripheral portion of the cornea 12 properly before and after molding. The fitting zone 24 of lens 10 has a radius of curvature defined by a fitting curve 34 with the radius of curvature being less than (i.e., shorter than) the radius of curvature associated with the plateau curves 32. This shorter radius of curvature of the fitting zone 24 yields a fitting curvature 36 that is much steeper than the plateau curve 32. Although the fitting curve 34 is much steeper (smaller radius) than the plateau curves 34, the curvature 34 may not necessarily be steeper than the measured curvature of the central portion of the cornea 12.

The fitting zone 24 acts as a transition region between the plateau zone 22 and the alignment zone 26. The fitting zone 24 brings the posterior surface of the contact lens 10 to a bearing relationship on the mid-peripheral portion of the cornea 12 under the plateau zone 22, and provides compression force on the plateau zone 22, thereby compressing the mid-peripheral portion of the cornea 12, for dual molding of the cornea 12. In one embodiment of the present invention, the width of the fitting zone 24 ranges from 0.1 mm to 2.0 mm, the radius of curvature for the fitting curve 34 is 5-30 diopters steeper than the plateau curve 32, and is 15 diopters flatter to 15 diopters steeper than the base curve.

The alignment zone 26 is designed to provide and maintain centration of the lens 10 by having a radius of curvature that is either the same as, or slightly longer than the central curvature of the cornea 12 (i.e., to match the peripheral cornea). A predefined alignment curve 36 defines the curvature of the alignment zone 26, which is almost the same as the measured curvature of the portion of the cornea 12 circumscribing the central portion of the cornea 12. The alignment zone 26 creates a large bearing area in a region corresponding with the portion of the cornea 12 where a centering force is created that maintains the optical zone 20 substantially at the apical center of the cornea 12. In one embodiment, the width of the alignment zone 26 ranges from 0.1 mm to 5.0 mm (depending on the fitting characteristics desired and the particular shape factors of the cornea 12), the radius of curvature for the alignment curve 36 is 1-30 diopters steeper than the plateau curve 34, and the alignment curve 36 is also about 1-25 diopters less steep (i.e., flatter) than the fitting curve 36.

The lens 11 illustrated in FIG. 5 has a spherical front surface configured for correcting distance vision, and is appropriate for use as an ortho-k retainer lens. In order to provide PVS vision with an ortho-k lens according to the present invention, however, two front optical zones can be further provided as described above for the lens 10, i.e. a center far optical zone and a peripheral near optical zone with ADD for PVS reading, similar to that of the front optical zones 201f and 202f in contact lens 10. The two front optical zones can be merged with a reverse-aspheric curvature with minus eccentricity for smooth transition without image jump. Such a dual function contact lens 11 is effective for PVS reading if worn during waking hours, while it is also useful in reshaping the cornea 12 during sleeping hours for orthokeratology, to create PVS multifocal vision without contact lenses. The use of an intermediate zone 24 and lenticular curve 203f as described for the contact lens 10 is also applicable for the dual function contact lens 11.

Referring to FIGS. 3-6, the peripheral zone 28 is designed with a radius of curvature longer than that of the cornea 12, yielding a curvature less than a measured curvature of a portion of the cornea 12 circumscribing the central portion of the cornea 12 (corresponding to the connecting zone 26 of the lens 11). The peripheral zone 28 has its surface contour defined by a predefined peripheral curve 42 which has a curvature that nearly parallels the portion of the cornea 12 underneath it, but is flatter than the cornea 12.

The peripheral zone 28 also preferably comprises an edge lift to promote tear flow under the contact lenses 10 and 11 by taking advantage of a tear pumping action created when an individual blinks the eyelid. This tear flow allows constant lubrication and oxygenation of the lens-cornea interface and results in a more comfortable and wearable lens 10 and 11. Additionally, the edge lift preferably allows easy contact lens removal from the cornea 12.

In one embodiment of the present invention, the width of the peripheral zone 28 ranges from 1 mm to 6.0 mm, and the radius of curvature for the peripheral curve 42 is 0-15 diopters longer (flatter) than the base curve 30.

The different radii used to define the base curve 30 in contact lens 10 and back optical zone curves 301*b*, 302*b* in contact lens 11, the connecting zone complex 22-26, and the peripheral curve 42 and their relative thickness are calculated after careful examination of a patient's eye and the associated ocular tissue. The corneal curvature must be measured, the proper contact lens power defined, and the anticipated physiological response to the contact lenses 10 and 11 must be determined. An individual skilled in the examination techniques of the ocular system is capable of performing these tasks.

EXAMPLES

Example 1

RGP for Myopia Control and Accommodation Assistance

A pair of rigid gas permeable PVS contact lenses according to the present invention were provided for a 21 year old high myopic patient (designated AA790522) for daywear. The subject was experiencing worsening myopia despite being an adult. He was also a victim of binocular dysfunction with subnormal accommodation from the young age, and spectacles with an ADD of +2.00 D were required to compensate for the subnormal accommodation. We designed him a PVS multifocal RGP to simulate ortho-K treatment for slowing down myopia progression as well as assisting subnormal accommodation for PVS reading. The contact lenses had the following dimensions:

KM: OD: 43.00/44.50 @ 90°
OS: 43.25/44.50 @ 90°
Refraction:
OD: −10.00—1.50×180° (myopia 10 D and minus cylinder 1.50 D)
OS: −10.00—1.25×175° (myopia 10 D and minus cylinder 1.25 D)
ADD=+2.00 D (OU) at 40 cm by cross cylinder
OD: MR lens/43.75/−9.50/10.4 mm/HDS
OS: MR lens/43.75/−9.50/10.4 mm/HDS
Front Contour:
Center (far) optical zone 201*f*: radius of curvature 9.42 mm
Peripheral (near) optical zone 202*f*: radius of curvature 8.58 mm; connecting to 201*f* in −1.08 e reverse aspheric curve (ADD+5.00 D)
Front intermediate zone 24: radius of curvature 7.88 mm for steep ridge
Back Contour:
Aspheric optical zone 20: width 5.2 mm, radius of curvature 8.04 mm; e=0.78
Connecting zone (22-24): width 1.0 mm, radius of curvature 7.51 mm
Alignment zone 26: width 1.2 mm, radius of curvature 7.89 mm; e=0.40
Peripheral zone 28: width 0.4 mm, radius of curvature 11.80 mm
Lens power: −7.75
Center thickness: 0.14 mm The patient wore the pair of PVS RGP lenses and had 20/25+ distance vision as well as J3 near vision without image jump or glare. The topography with the contact lens is very close to a post ortho-K treatment zone with a PVS contour.

Example 2

Soft Contact Lens for Presbyopia

A pair of PVS soft contact lenses, having the following dimensions, was provided for a 51 year old myopic presbyopia patient (designated AA500816) for daywear to correct far and near vision:

KM: OD: 47.25/47.50 @ 90°
OS: 47.0/47.50 @ 90°
Refraction:
OD: −5.00 (myopia 5 D)
OS: −4.75 (myopia 4.75 D)
Near vision: J15 (OU)
ADD=+2.00 D (OU) at 40 cm
OD: SMR lens/44.0/−4.75/14.0 mm/methfilcon A 55% water
Front Contour (Right Lens):
Center (far) optical zone 201*f*: radius of curvature 10.60 mm
Peripheral (near) optical zone 202*f*: radius of curvature 8.76 mm; connecting to 201*f* in −1.39 e reverse aspheric curve (ADD+8.00 D)
Intermediate (lenticular) zone 24/curve 203*f*: width 8.61 mm/radius of curvature 8.32 mm
Back Contour (Right Lens):
Optical zone (201*f*, 202*f*, and 24): width 8.61 mm, radius of curvature 9.37 mm;
Alignment zone 26: width 1.7 mm, radius of curvature 7.34 mm; e=0.40
Peripheral zone 28: width 1.0 mm, radius of curvature 10.13 mm
Lens power: −4.75
Center thickness: 0.19 mm
OS: SMR lens/44.0/−4.50/14.0 mm/methfilcon A 55% water
Front Contour (Left Lens):
Central (far) optical zone 201*f*: radius of curvature 10.53 mm
Peripheral (near) optical zone 202*f*: radius of curvature 8.72 mm; connecting to 201*f* in −1.37 e reverse aspheric curve (ADD+8.00 D)
Intermediate (lenticular) zone 24/curve 203*f*: width 8.61 mm/radius of curvature 8.30 mm
Back Contour (Left Lens):
Optical zone (201*f*, 202*f*, and 24): width 8.61 mm, radius of curvature 9.37 mm;
Alignment zone (26): width 1.7 mm, radius of curvature 7.34 mm; e=0.40
Peripheral zone 28: width 1.0 mm, radius of curvature 10.13 mm
Lens power: −4.50
Center thickness: 0.20 mm The patient wore the pair of PVS soft contact lenses and had 20/20 distance vision as well as J3 near vision without image jump or glare. The topography with the contact lens is very close to a post ortho-K treatment zone with a PVS contour.

Example 3

Ortho-k RGP Contact Lens for Far Vision and Presbyopia Correction

A pair of PVS dual function ortho-k contact lenses, having the following dimensions, was provided for a 50 year old myopic presbyopia patient (designated AA521002) for nightwear to correct far and near vision in order to be free of spectacles and contact lenses in the day time:

KM: OD: 43.00/44.50 @ 90°
OS: 43.00/44.00 @ 90°
Refraction:
OD: −6.00 (myopia 6 D)
OS: −6.50 (myopia 6.50 D)
Near vision: J15 (OU)
ADD=+2.00 D (OU) at 40 cm
OD: MP2 lens/43.50/−6.00/10.8 mm/HDS 100/ADD+2.50
Front Contour (Right Lens):
Central (far) optical zone 201f: radius of curvature 9.05 mm
Peripheral (near) optical zone 202f: radius of curvature 8.45 mm; connecting to 201f in −0.95 e reverse aspheric curve (ADD+2.50 D)
Intermediate (lenticular) zone 24/curve 203f: width 7.0 mm/radius of curvature 7.88 mm
Back Contour (Right Lens):
Far and near optical zone 201b-202b: width 3.8 mm, radius of curvature
9.21 mm; e=−1.88, ADD at outermost margin=+2.5 D
Connecting zone 1 (22): width 1.2 mm, radius of curvature 9.54 mm; (for molding a flatter peripheral optical zone for distance vision
Connecting zone 2 (24): width 0.3 mm, radius of curvature 5.28 mm; (for molding a steep ridge)
Alignment zone 26: width 1.6 mm, radius of curvature 7.92 mm; e=0.40
Peripheral zone 28: width 0.4 mm, radius of curvature 11.5 mm
Lens power: +1.25 D
Center thickness: 0.24 mm
OS: MP2 lens/43.50/−6.50/10.8 mm/HDS 100/ADD+2.50
Front Contour (Left Lens):
Central (far) optical zone 201f: radius of curvature 9.15 mm
Peripheral (near) optical zone 202f: radius of curvature 8.54 mm; connecting to 201f in −0.97 e reverse aspheric curve (ADD+2.50 D)
Intermediate (lenticular) zone 24/curve 203f: width 7.0 mm/radius of curvature 7.82 mm
Back Contour (Left Lens):
Far and near optical zones 201b-202b: width 3.8 mm, radius of curvature 9.32 mm;
e=−1.92, ADD at outermost margin=+2.5 D
Connecting zone 1 (22): width 1.2 mm, radius of curvature 9.65 mm; (for molding a flatter peripheral optical zone for distance vision
Connecting zone 2 (24): width 0.3 mm, radius of curvature 5.19 mm; (for molding a steep ridge)
Alignment zone (26): width 1.6 mm, radius of curvature 7.92 mm; e=0.40
Peripheral zone 28: width 0.4 mm, radius of curvature 11.5 mm
Lens power: +1.25 D
Center thickness: 0.24 mm The patient wore the pair of dual function PVS ortho-k contact lenses and had 20/20 distance vision as well as J3 near vision without image jump with mild glare. After wearing the lens for 7 consecutive nights, the distance vision after lens removal was 20/20 (OU), while the near vision was as good as J3. The multifocal vision was clear and comfortable for far and near without significant glare. The topography of the treatment zone being a PVS contour merges the center far zone into a full ADD near zone well within 2-3 mm of the para-axis cornea area.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

Recitation of value ranges herein is merely intended to serve as a shorthand method for referring individually to each separate value falling within the range. Unless otherwise indicated herein, each individual value is incorporated into the specification as if it were individually recited herein. All references cited herein are incorporated by reference in their entirety.

What is claimed is:

1. A multi-focal lens having a front surface, a back surface, and an optical axis, comprising:
   a center optical zone in a central portion of the lens, wherein the center optical zone focuses light that enters the front surface of the lens in a direction substantially parallel to the optical axis to create a first focal point within 2.5° of the optical axis;
   a peripheral optical zone located adjacent and radially outwardly from the center optical zone, wherein the peripheral optical zone focuses light that enters the front surface of the lens in a direction not parallel to the optical axis to create a second focal point at between 2° and 10° with respect to the optical axis,
   wherein the curvature of either the front surface or the back surface of the lens in the peripheral optical zone is steeper than the curvature of the front surface or the back surface of the lens in the center optical zone, respectively, by at least 2 diopters, and wherein the first focal point and the second focal point do not overlap.

2. The lens of claim 1, wherein the curvature of the front surface of the peripheral optical zone is steeper than the curvature of the front surface of the central optical zone by at least 2 diopters.

3. The lens of claim 2, wherein the curvature of the front surface of the peripheral optical zone becomes progressively steeper radially outwardly from an inner radial zone to an outer radial zone, with the curvature of the front surface of the inner radial zone being at least 4 diopters steeper than the curvature of the front surface of the center optical zone, and the curvature of the front surface of the outer radial zone being up to 10 diopters steeper than the curvature of the front surface of the center optical zone.

4. The lens of claim 1, wherein the curvature of the front surface of the center optical zone merges with the curvature of the front surface of the peripheral optical zone with an aspheric or reverse-aspheric curve having a predetermined e-value.

5. The lens of claim 4, wherein the curvature of the front surface of the center optical zone merges with the curvature of the front surface of the peripheral optical zone with an aspheric or reverse-aspheric curve having a e-value between −0.7 and −3.0 e, with the curvature becoming progressively steeper radially outwardly.

6. The lens of claim 1, wherein the lens is selected from the group consisting of a spectacle lens, a contact lens, and an intraocular lens.

7. The lens of claim 6, wherein the lens is a contact lens.

8. The lens of claim 7, wherein the center optical zone has a diameter of between 0.4 mm and 0.6 mm.

9. The lens of claim 7, wherein the peripheral optical zone extends radially outwardly at an annular diameter of between 0.75 mm and 2.0 mm.

10. The lens of claim 9, wherein the peripheral optical zone extends radially outwardly at an annular diameter of between 0.85 mm and 1.8 mm from the center of the lens.

11. The lens of claim 7, further comprising:
an inner intermediate zone coupled to and extending radially outward from the peripheral optical zone, having a refractive power for far vision.

12. The lens of claim 11, further comprising:
an outer intermediate zone coupled to and extending radially outward from the inner intermediate zone, wherein the outer intermediate zone has a front surface having a curvature steeper than the curvature of the front surface of the inner intermediate zone of between 1 and 30 Diopters, thereby forming a steep ridge for simulation of an ortho-K treatment zone for myopia retardation.

13. The lens of claim 7, wherein the lens is a soft contact lens.

14. The lens of claim 1, wherein the lens is a contact lens for orthokeratology, comprising:
a center base curve in the back surface of the center optical zone of the lens, wherein the center optical zone diameter is between 0.4 mm and 0.6 mm, and
a peripheral base curve in the back surface of the peripheral optical zone, the peripheral optical zone having an annular diameter of between 3 mm and 5 mm from the center of the lens, wherein the peripheral base curve is steeper than the central base curve by between 2 and 10 diopters.

15. The lens of claim 14, wherein the curvature of the back surface of the center optical zone merges with the curvature of the back surface of the peripheral optical zone with an aspheric or reverse-aspheric curve having a e-value between −0.8 and −3.5 e, with the curvature becoming progressively steeper radially outwardly.

16. The lens of claim 14, wherein the back surface further comprises an inner connecting zone coupled to and extending radially outward from the peripheral optical zone, having a curvature flatter than the peripheral optical zone by between 1 and 10 diopters.

17. The lens of claim 16, wherein the back surface further comprises an outer connecting zone coupled to and extending radially outward from the inner connecting zone for bearing the contact lens on the cornea.

18. The lens of claim 6, wherein the lens is a spectacle lens, wherein the center optical zone has a diameter of between 1.35 mm and 1.75 mm.

19. The lens of claim 6, wherein the lens is a spectacle lens, wherein the peripheral optical zone extends radially outwardly at an annular diameter of between 2.3 mm and 6 mm from the center of the lens.

20. A method of treating presbyopia, comprising providing a lens according to claim 1 to a subject in need thereof.

21. A method of treating a subject at risk of myopia progression, comprising providing a lens according to claim 1 to a subject determined to be at risk of myopia progression.

22. The method of claim 21, wherein the subject is determined to have constant intermittent central suppression.

23. A multi-focal rigid contact lens for orthokeratology having a front surface and a back surface, comprising:
a center optical zone in a central portion of the lens, wherein the back surface of the center optical zone has a central base curve, and wherein the center optical zone diameter is between 0.4 mm and 0.6 mm, and
a peripheral optical zone located adjacent and radially outwardly from the center optical zone, the peripheral optical zone having an annular diameter of between 3 mm and 5 mm from the center of the lens, wherein the back surface of the peripheral optical zone has a peripheral base curve which is steeper than the central base curve by between 2 and 10 diopters.

24. The contact lens of claim 23, wherein the central base curve of the center optical zone is shaped to provide a subject with an on-axis focal point in the absence of the contact lens, and wherein the peripheral base curve is shaped to provide a subject with an off-axis focal point in the absence of the contact lens, wherein the first focal point and the second focal point do not overlap.

* * * * *